US00RE36143E

United States Patent [19]

Kind et al.

[11] E Patent Number: Re. 36,143

[45] Reissued Date of Patent: Mar. 16, 1999

[54] MOTORIZED DISPENSER FOR CONTINUOUS STRIP FOOD PRODUCT AND METHOD OF DISPENSING THE PRODUCT

[75] Inventors: Michael Kind, Philadelphia; Alan Dorfman, Richboro, both of Pa.; Io Nin Ku, Macau, Macau

[73] Assignee: Basic Fun, Inc., Southampton, Pa.

[21] Appl. No.: 912,143

[22] Filed: Aug. 15, 1997

Related U.S. Patent Documents

Reissue of:

[64] Patent No.: 5,579,669
Issued: Dec. 3, 1996
Appl. No.: 388,008
Filed: Feb. 13, 1995

[51] Int. Cl.[6] ..... B26D 5/20; B26D 7/00

[52] U.S. Cl. ..... 83/13; 83/225; 83/436.1; 83/649; 83/932; 242/588.6

[58] Field of Search ..... 83/13, 225, 221, 83/436.1, 949, 650, 649, 932; 225/10, 66, 77; 242/564.4, 588.6

[56] References Cited

U.S. PATENT DOCUMENTS

| | | | |
|---|---|---|---|
| 2,276,296 | 3/1942 | Flood . | |
| 2,587,928 | 3/1952 | Tuck et al. . | |
| 2,912,140 | 11/1959 | Cole . | |
| 3,231,130 | 1/1966 | Foote . | |
| 3,494,235 | 2/1970 | Postolowski | 83/225 |
| 3,566,732 | 3/1971 | Hasten . | |
| 4,170,914 | 10/1979 | Carrier | 225/43 |
| 4,637,523 | 1/1987 | Lavesseur . | |
| 4,646,059 | 2/1987 | Phillips et al. | 83/649 |
| 4,712,460 | 12/1987 | Allen et al. | 83/649 |
| 5,107,734 | 4/1992 | Armbruster | 83/649 |
| 5,133,980 | 7/1992 | Ream et al. | 225/43 |
| 5,384,003 | 1/1995 | Mitchell | 83/649 |

OTHER PUBLICATIONS

Five Pages Document Titled "Battery Operated Bubble Gum Tape Dispenser", 1993.

5 Page Affidavit of Alan Dorfman and photographs of Gumzilla motorized strip gum dispensing toy attached thereto as Exhibits A through D (Feb. 1994).

*Primary Examiner*—Kenneth E. Peterson

*Attorney, Agent, or Firm*—Caesar, Rivise, Bernstein, Cohen & Pokotilow, Ltd.

[57] ABSTRACT

The combination of a dispenser and a strip of a food product and a method for dispensing the food product from the dispenser so that it can be used by a user of the dispenser. The strip comprises an elongated web of an edible material, e.g., gum, which is coiled up in a compact configuration having a free end portion. The dispenser comprises a housing for the strip, an outlet, a motor for advancing a desired length and most preferably any desired length of the free end portion of the strip out of the outlet, and a severing element for severing the desired length of the free end portion of the strip from the remaining portion of the strip to form a dispensed section of the strip which may be placed in the user's mouth while the remaining portion of the strip remains within the housing.

This is a Reissue of a Patent which was the subject of Reexamination Certificate No. B1 5,579,669, dated Sep. 16, 1997, Request No. 90/004,572.

11 Claims, 4 Drawing Sheets

FIG. 1
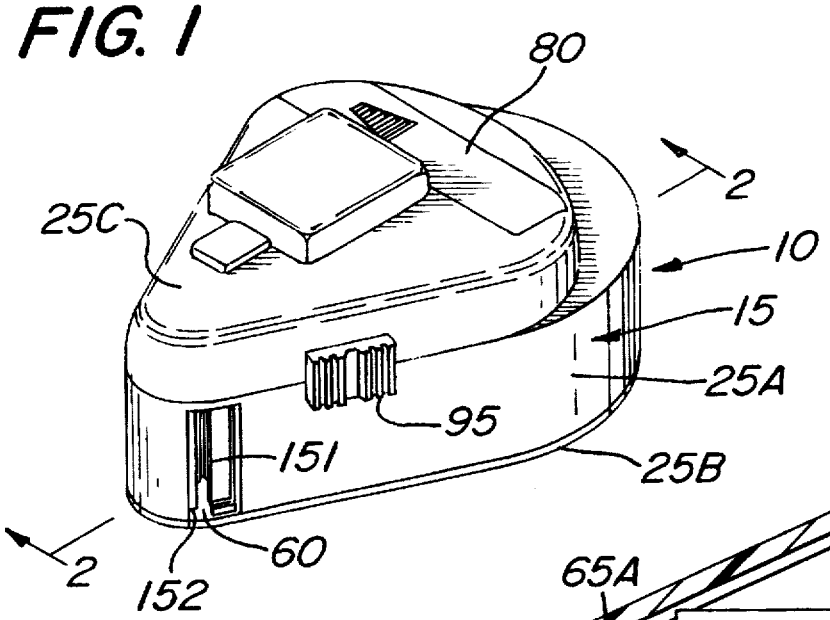
FIG. 5A
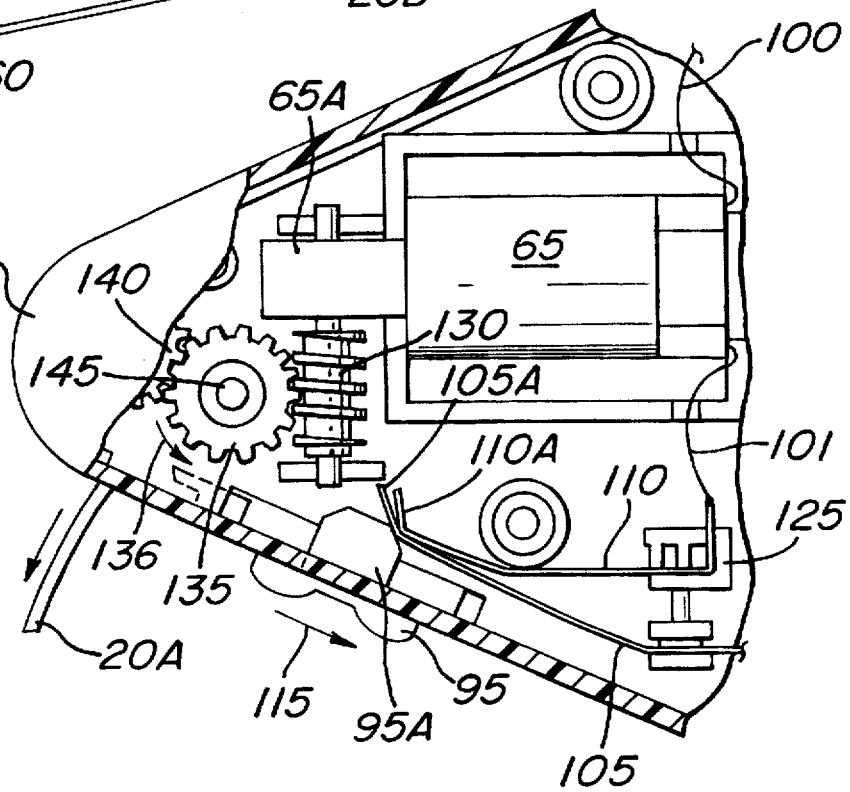
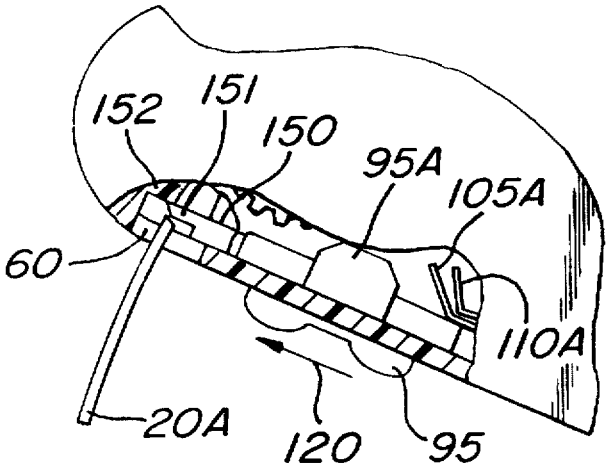
FIG. 5B

MOTORIZED DISPENSER FOR CONTINUOUS STRIP FOOD PRODUCT AND METHOD OF DISPENSING THE PRODUCT

Matter enclosed in heavy brackets [ ] appears in the original patent but forms no part of this reissue specification; matter printed in italics indicates the additions made by reissue.

*This case is a reissue of U.S. Pat. No. 5,579,669.*

BACKGROUND OF THE INVENTION

This invention relates generally to dispensing and more particularly to portable apparatus for dispensing a desired length and most preferably any desired length of a strip food product from a reel of such a product stored in the apparatus.

U.S. Pat. No. 3,566,732 (Hasten et al.) discloses a spring loaded vending machine having a rotary conveyor to move a flexible carrier strip carrying plural individual items from a storage area in the machine to a cutter. The individual items, e.g., food products, are held on the carrier strip by means of equidistantly spaced pockets. The strip is drawn to the rotary conveyor so that each of the food holding pockets of the strip is disposed within a respective recess in the periphery of the conveyor to convey the respective food items to the cutter. The cutter severs the leading individual item from the strip at a points between it and the immediately succeeding pocket, whereupon the pocket portion of the strip and the food product held therein drops to a discharge bin for removal from the machine.

The prior art also includes other United States Letters Patent disclosing various types of devices for housing and dispensing individual labels or other items temporarily adhesively secured onto a carrier strip or web of tape. For example, in U.S. Pat. No. 2,276,296 (Flood) there is disclosed a label dispenser device wherein individual labels are temporarily adhesively secured onto a spiral carrier strip or reel of tape. The labels of the reel are removed by pulling on the free end of the strip to draw the label at the free end manually out of an outlet in the device's housing. A sharp cutting blade is provided at the label outlet of the housing to sever the dispensed label at the point where it exits an outlet in the housing.

In U.S. Pat. No. 2,587,928 (Tuck et al.) there is disclosed a pill dispenser device wherein a fan-folded carrier strip of tape stores a plurality of pills at equidistantly spaced locations therealong. The leading edge of the carrier strip is arranged to be grasped so that the pill at the leading or free end of the strip exits out of the housing's outlet. A serrated edge is provided at the outlet to sever the dispensed carrier and associated pill.

In U.S. Pat. No. 2,912,140 (Cole) there is disclosed a disk-like label dispenser device wherein a spiral reel of tape stores a plurality of disk like labels at equidistantly spaced locations therealong. The leading edge of the carrier strip is arranged to be grasped so that the disk-like label at the leading or free end of the strip exits out of the housing's outlet in an orientation generally parallel to the top edge of the dispenser while the tape strip is oriented or bent downward therefrom at an angle in excess of 90 degrees. This action effectively peels the label from the backing tape. U.S. Pat. No. 3,231,130 (Foote) discloses an alternative embodiment of a label dispenser to those described above.

In U.S. Pat. No. 4,637,523 (Levasseur) there is disclosed a stamp dispenser device wherein a spiral reel of tape stores a plurality of stamps from a roll which is driven by a motor and associated friction or pinch rollers to advance the stamp for dispensation. The device uses light emitting diodes to determine the boundary between the stamps and for enabling the roll to be severed at the appropriate place on the stamp roll.

While all of the aforementioned patents appear suitable for their intended purposes, none seem suitable for dispensing an indeterminate length food product, e.g., chewing gum, stored as a reel within the housing, wherein the amount or length of the product dispensed is selectable at will by the user of the device.

OBJECTS OF THE INVENTION

Accordingly, it is a general object of this invention to provide a dispenser which achieves those ends.

It is a further object of this invention to provide a device for dispensing an indeterminate length of food product stored as a reel within the housing, wherein the amount or length of the product dispensed is selectable at will by the user of the device.

It is a further object of this invention to provide a device for motorized dispensing of an indeterminate length food product stored as a reel within the housing, wherein the amount or length of the product to be dispensed is selectable at will by the user of the device.

It is still a further object of this invention to provide a small hand-holdable device for dispensing any length of a strip of a food product, e.g., chewing gum, in a easy manner.

SUMMARY OF THE INVENTION

These and other objects of this invention are achieved by providing in combination a dispenser and a strip of a food product, and a method of dispensing the food product from the dispenser so that it can be used by a user of the dispenser. The strip food product comprises an elongated web of an edible material, e.g., chewing gum, which is coiled up in a compact configuration having a free end portion.

The dispenser comprises a housing for the strip, an outlet, motor means for advancing a desired length and most preferably any desired length of the free end portion of the strip out of the outlet, and severing means for severing the desired length of the free end portion of the strip from the remaining portion of the strip to form a dispensed section of the strip which may be placed in the mouth of the user, while the remaining portion of the strip remains within the housing.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is an isometric view of the dispenser of the present invention;

FIG. 5A is an enlarged view, partially in section, of the components located within area encircled by the broken line in FIG. 4; and FIG. 5B is an enlarged top view, partially in section, showing a dispensed portion of a food strip being severed in accordance with an aspect of the present invention.

DETAILED DESCRIPTION OF THE PREFERRED EMBODIMENTS

Figure 2:
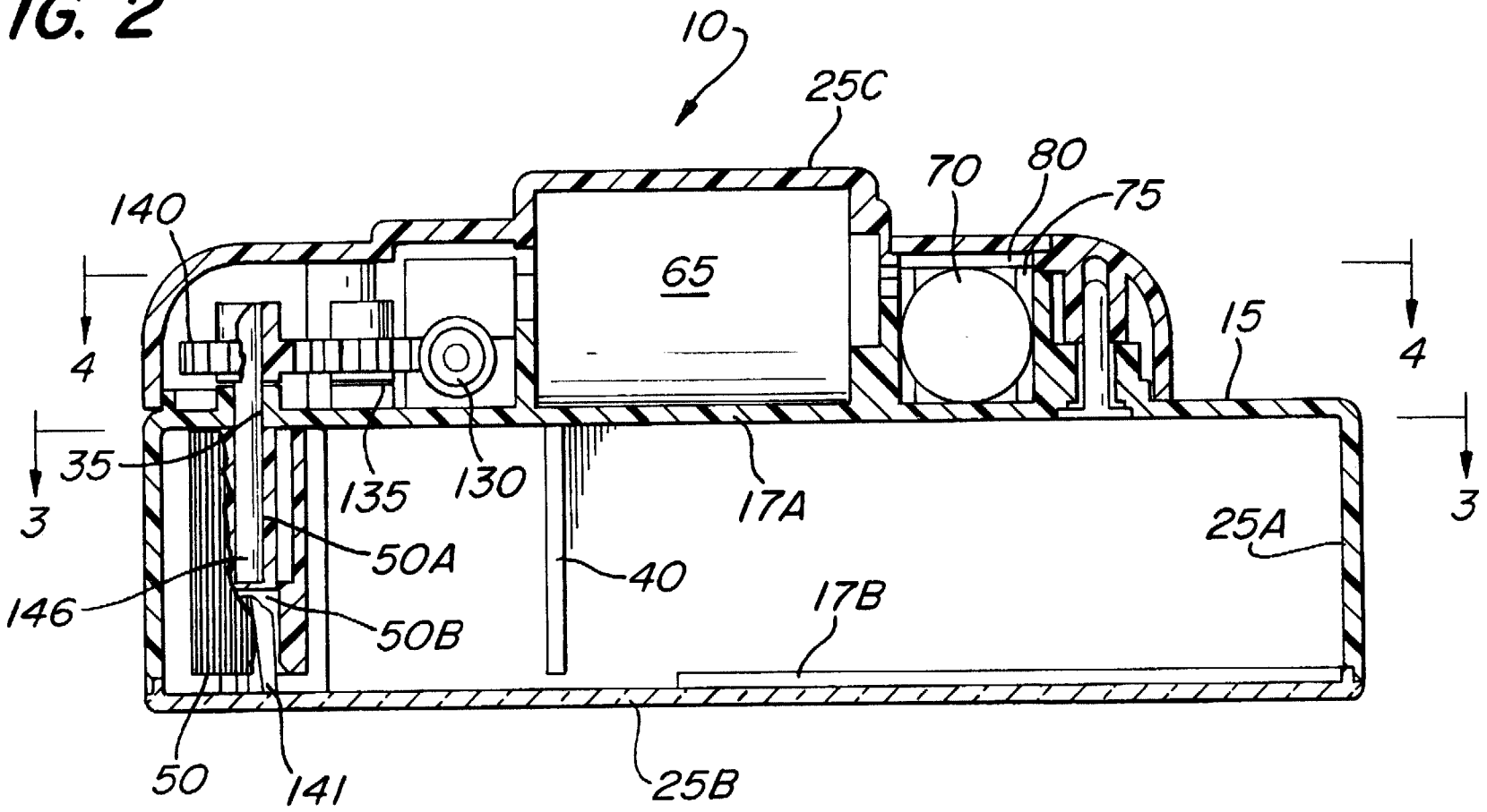
FIG. 2 is an enlarged sectional view taken along line 2—2 of FIG. 1.

Referring now to various figures of the drawings wherein like reference numerals refer to like parts there is shown at 10 in FIG. 1, a dispenser constructed in accordance with this subject invention.

The dispenser is a small, portable, hand-holdable unit containing all of the components making up the dispenser. As illustrated in the drawing, the unit basically comprises a housing 15 which is assembled as an integral unit of molded plastic parts. The housing 15 basically comprises a generally tear-drop shaped flanged cover 25A and a correspondingly shaped planar base plate 25B. A smaller generally tear-drop shaped flanged lid 25C is disposed over the cover 25A and will be described later.

Figure 3:
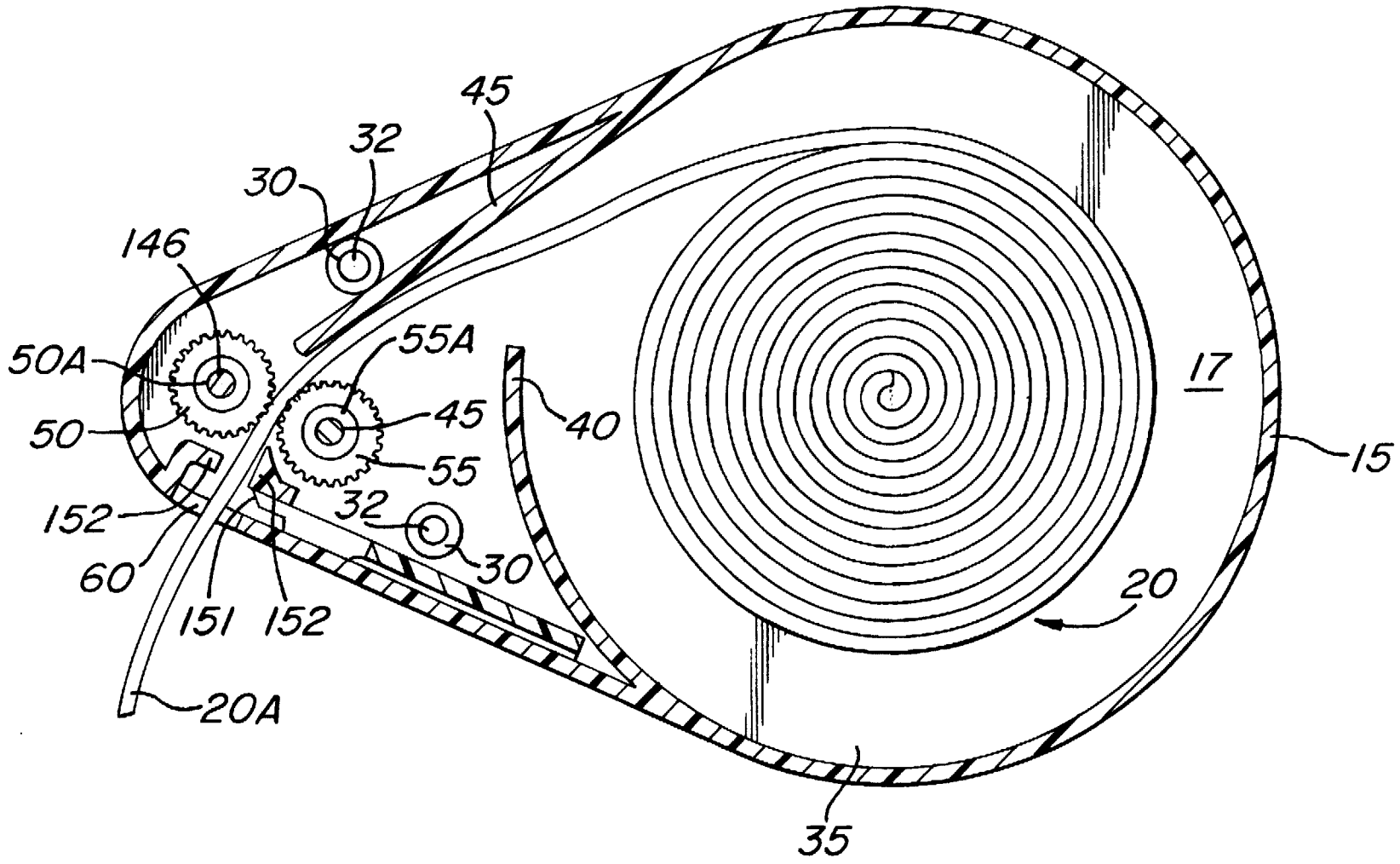
FIG. 3 is a sectional view taken along line 3–3 of FIG. 2.

As can be seen clearly in FIGS. 1 and 2, the base plate 25B is snap-fit into frictional engagement with the peripheral sidewall of the flanged cover to define therebetween a hollow interior space. In particular, as shown in FIGS. 2 and 3, the hollow interior of the housing 15 between the bottom plate 25B and the flanged cover 25A forms a storage compartment or space 17 disposed between walls 17A and 17B. The compartment 17 serves to store the food product to be dispensed by the unit. That product is denoted by the reference number 20 and basically comprises an elongated web or strip 20 of any suitable food product, e.g., any edible or chewable material such as chewing gum, dried fruit, candy, etc. The dispenser of the present invention dispenses a desired length of food product and most preferably any desired length. The food product 20 is coiled prior to insertion into the dispenser housing. The width of the coil strip of product 20 is preferably slightly less than the spacing between the storage compartment walls 17A and 17B so that the coiled strip of food product substantially fills most of the storage compartment as shown in FIGS. 2 and 3.

As mentioned previously the base plate 25B is snap-fit to the flange cover 25A. Alternatively, the base plate may be hingedly secured to the peripheral sidewall of the cover 25A if desired. In any case, the base plate is arranged to be either removed or opened from the cover 25A to provide access to the interior compartment 17 to enable the loading of a coiled strip of food product 20 into the compartment. In accordance with the embodiment shown herein, the removable base plate 25B is releasably secured to the dispenser cover by means of a plural projecting cylindrical pins (not shown). These pins project upwardly perpendicularly from the inside face of the base plate 25B and are oriented and aligned to be located within respective ones of plural cylindrical sockets 30 projecting downwardly from the inside wall 17A of the cover 25A as shown in FIGS. 2 and 3. Each of the sockets has a cylindrical bore therein for frictionally engaging a respective one of the projecting pins of the base plate, thereby releasably securing the base plate to the cover.

As shown in FIG. 2, and as mentioned earlier, the housing 15 also includes the top cover or lid 25C. The lid is disposed over the flange cover 25A to form an interior space therebetween in which various components, e.g., a motor (to be described later), a battery (to be described later), and a drive assembly (to be described later) which power and operate the dispensing unit 10 are located.

The wall 17A separates the space in which the motor, battery and drive assembly from the space in which the food product is located to isolate the food product therefrom and thereby keep the food product sanitary.

As shown clearly in FIG. 3, the food product 20 is disposed in a compact, coiled configuration within the storage compartment 17 of the housing except for its free-end portion 20A which is oriented generally linerally to extend out of the storage compartment through an outlet or slot 60 in the flanged sidewall of the cover 25A. To that end, the leading edge of the elongated strip is partially unwound from the coil of the strip and the unwound portion is extended between a pair of drive rollers 50 and 55 to the opening or slot outlet 60. The drive rollers 50 and 55 are coupled to components forming the drive assembly of the unit which are located under the top lid 25C. When driven by the drive assembly, the drive rollers frictionally engage opposite sides of the strip therebetween, whereupon the rotation of those drive rollers advances the free-end portion of the strip out of the outlet 60 when the motor of the unit is operated, as will be described later. Guidance of the linear or free-end extending portion of the food strip is achieved by plural guide rails 40 and 45 which project from the wall 17A in the storage compartment. These guide rails guide the strip to the drive rollers to ensure smooth operation of the device under control of the motor.

Figure 4:
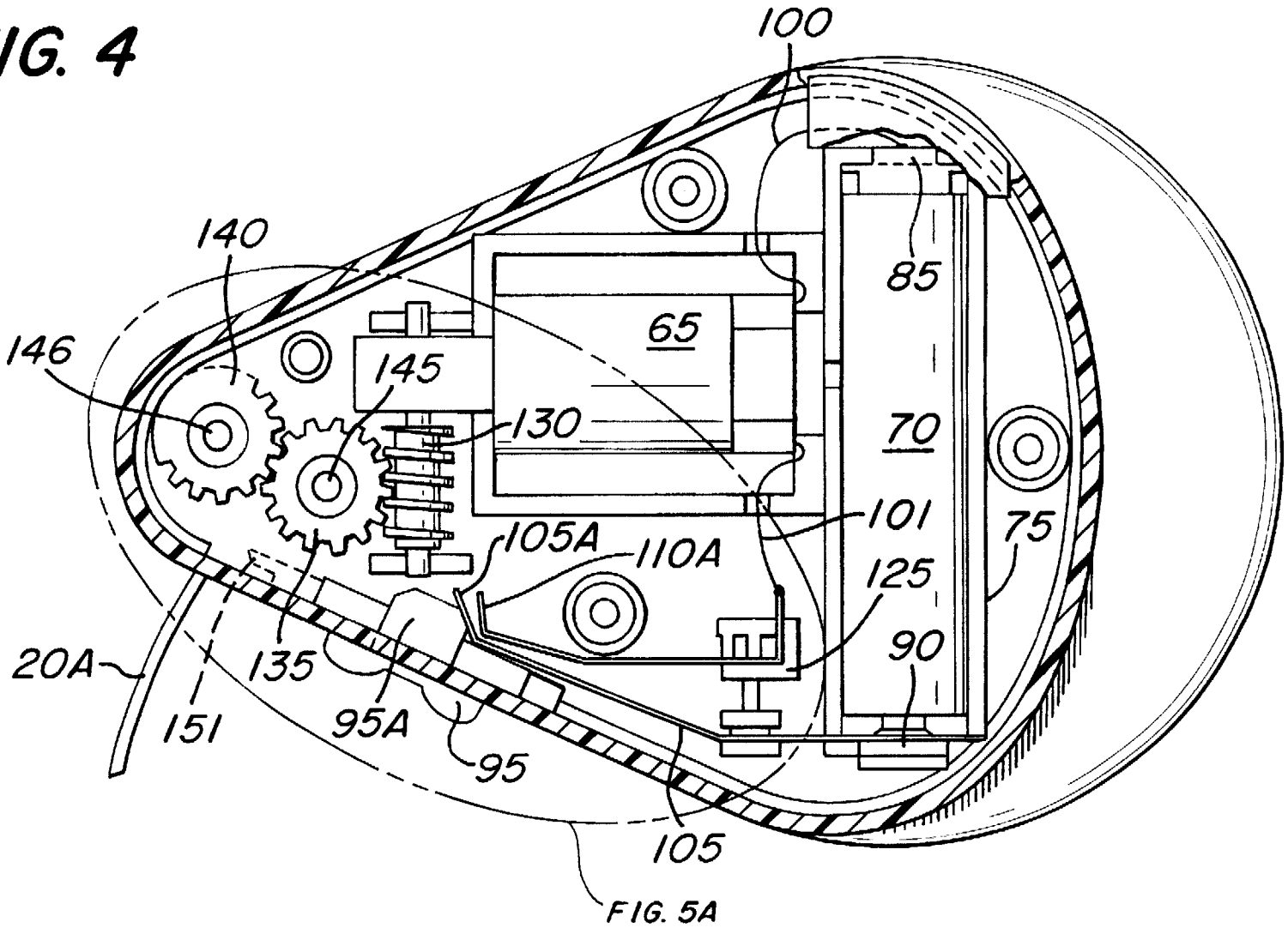
FIG. 4 is a sectional view taken along line 4—4 of FIG. 2.

As mentioned earlier, a key feature of the subject invention is that the strip 20 can be dispensed in a desired length and most preferably in any length desired by the user. To that end, as shown in FIG. 4, an electrically operated motor 65 is provided for the device. The motor 65 is disposed under the lid or cover 25C and is coupled to a drive assembly for rotating the drive rollers 50 and 55 to advance any desired length of the free-end portion 20A of the strip out of the dispensing slot 60. The motor basically comprises any suitable small electrically operated device. Electric power for the motor is provided by a conventional battery, e.g, a single AAA cell 70. The battery 70 is located within a battery compartment 75 located under the top lid 25C. As shown in FIGS. 1 and 2, the battery compartment includes a sliding door or hatch 80 to enable the user of the device to have access to the battery compartment for replacement of the battery when desired The battery compartment comprises a negative terminal 85 and a positive terminal 90 to engage the cathode and anode, respectively, of the battery 70.

Electric power from the battery to the motor is provided by means of a direct current circuit made up of a manually operable, 3-position switch 95, a pair of electrical conductors 100 and 101 and a pair electrically conductive spring blades 105 and 110. The spring blades 105 and 110 are mounted within the housing by means of a bracket 125 (see FIG. 5A). The spring blade 110 includes a free-end portion 110A while the blade 105 includes a free-end portion 105A. The free-end portions 110A and 105A are normally spaced from each other so that the blades are electrically isolated from each other (see FIG. 4).

As can be seen the conductor wire 100 is directly connected between the batteries cathode contact 85 and one input of the motor 65. The batteries anode contact 90 is electrically connected to one end of the spring blade 105. The other spring blade 110 is connected to conductor wire 101 which in turn is connected to the other input to the motor.

The slide switch 95 is slidably mounted within a slot (not shown) in a portion of the flanged sidewall of the cover 25A in a contiguous portion of the flanged sidewall of the lid 25C as shown in FIG. 1. The switch 95 is arranged to be slid into any one of three longitudinal positions, namely a middle or "OFF" position, a rearward or "ON" position, and a forward or "CUT" position. The switch 95 includes a post portion 95A projecting from the rear thereof which is arranged to engage the free-end 105A and 110A of the spring contacts 105 and 110, respectively to cause them to be in electrical continuity when the switch is moved to the "ON" position.

As will be appreciated by those skilled in the art, when this occurs a complete circuit is achieved whereupon electric power is provided from the battery to the motor causing the motor to operate. The switch is normally in the middle or "OFF" position, whereupon the post 95A of the switch does not cause the free-end of the contact 105 to engage the free-end of the contact 110. Hence, electrical power is not provided to the motor from the battery. This condition is shown in FIG. 4 and represents the situation wherein the switch is in the "OFF" position. In order to cause the motor to operate to advance the free-end of the food strip 20A out of the outlet, all that is necessary is to pull the slide switch to the rear as shown in the direction of arrow 115 in FIG. 5A whereupon the post 95A of the switch causes the free-end 105A of the contact blade 105 to engage the free-end 110A of the contact 110, thereby completing the electrical circuit.

When the switch is slid to the forward or "CUT" position, the post 95A of the switch is out of engagement with the free-end 105A of the blade 105 whereupon the contact blades 105 and 110 are electrically isolated from each other, thereby keeping the motor de-energized. As will be described later, the switch 95 is coupled to a cutting blade so that when the switch is moved to the forward or "CUT" position the portion of the strip 20A extending out of the outlet 60 is severed from the remaining portion of the strip within the units housing.

As can be seen in FIG. 5A, the motor includes a rotary output shaft 65A which is coupled by suitable conventional means (not shown) to a worm gear 130. The worm gear 130 is coupled to a pair of drive gears 135 and 140. The worm gear 130 and drive gears 130 and 140 form the heretofore identified drive assembly for the unit. The gears 135 and 140 have inter-engaging teeth about the periphery thereof whereupon when the motor is operated the drive gear 135 rotates in the direction of arrow 136 (see FIG. 5A) and the gear 140 rotates in the opposite rotational direction.

As shown in FIG. 4, the gears 135 and 140 include respective drive shafts 145 and 146 respectively. The shafts extend co-linearly along the axis of rotation of each of the gears and extend through respective openings 35 in the wall 17A to the interior compartment 17. The free-end of the drive shaft 146 extends into a bore 50A in the drive roller 50-and is fixedly secured thereto by any suitable means, e.g., an adhesive or mere frictional engagement In a similar manner the free-end of the drive shaft 145 extends into a bore 55A in the drive roller 55 and is fixedly secured thereto as shown in FIG. 3.

Thus, upon the operation of the motor, the rotation of the drive gears 135 and 140 affect a concomitant rotation of the drive rollers 55 and 50 respectively. In order to ensure that the rollers rotate about their longitudinal axis and do not skew, a pair of tapered pins 141 project upwardly from the inside surface of the base plate 25B along the respective axes of rotation of the rollers 50 and 55. Each of the tapered pins 141 is arranged to be received within a bore in the associated drive roller. Thus, as can be seen in FIG. 2, the upwardly projecting pin 141 extends into a bore 50B at the bottom of drive roller 50. In a similar manner, another tapered pin 141 extends into a bore 55B at the bottom of the drive roller 55.

Each of the drive rollers 50 and 55 includes a serrated outer surface enabling the roller to grab the leading edge of the strip 20A to advance the strip from the storage area 17.

When the desired length of the strip has been dispensed through the dispenser opening or slot 60 by the operation of the motor, the user slides the manually operable switch from either the "ON" position or from "OFF" position, as the case may be to the forward or "CUT" position. If the switch had been in the "ON" position, the movement of the switch to the "CUT" position causes the blades 105 and 110 to disengage thereby de-energizing the motor so that further advancement of any portion or the strip out of the outlet ceases.

In order to sever the portion of the strip extending out of the outlet from the remaining portion of the strip, the dispenser unit 10 comprises severing means 150 coupled to the preposition slide switch 95. The severing means is arranged so that when the slide switch is slid to the "CUT" position, the severing means severs the free-end portion of the strip extending out of the outlet from the remaining portion of the strip.

As can be seen clearly in FIGS. 1, 3 and 5B, the severing means basically comprises a generally planar member having a top edge in the form of a tapered cutting blade. The cutting edge extends along the length of the slot 60 forming the outlet of the dispenser unit. A guide bar 152 (FIG. 3) projects inward from the cover 25C to guide the severing blade 151. A stop 153 extends along the opposite side of the slot 60 from the cutting blade to serve as a stop edge against which the cutting blade 151 bears when the cutting blade is moved to the "CUT" position by the switch to thereby sever the extending portion of the food strip 20A as shown in FIG. 5B. The severing means 150 is connected to the slide switch 95 by any suitable means so that it is moved therewith.

Once the extending portion of the strip 20A has been severed by the severing means 150 it can then be placed in the mouth of the user for use.

Without further elaboration the foregoing will so fully illustrate our invention that others may, by applying current or future knowledge, adapt the same for use under various conditions of service.

We claim:

1. A method for dispensing a strip of a food product in a desired length from a portable dispenser, said dispenser having a slotted housing, an outlet, severing means, motor means, and a manually actuated switch for causing said motor means and said severing means to operate, said switch being mounted in said slot of said housing and being arranged to linearly slide into any one of three positions, said switch having a first position wherein said motor means is not energized, a second position wherein said motor means is energized, and a third position, said severing means being mounted on said switch such that movement of said switch from said second position to said third position causes said food product to be severed, said strip comprising an elongated web of an edible material, said method comprising disposing said strip within the dispenser so that said strip is coiled up in a compact configuration having a free end portion extending to said outlet, sliding said switch from said first position to said second position to advance a desired length of said free end portion of said strip out of said outlet, and sliding said switch from said second position to said third position to sever said desired length of said free end portion of said strip from the remaining portion of said strip to form a dispensed section of said strip which may be placed in a user's mouth, while the remaining portion of said strip remains within said dispenser.

2. The method of claim 1 including the steps of advancing any desired length of the free end portion of the strip out of the outlet.

3. In combination a dispenser and a strip of a food product, said strip comprising an elongated web of an edible material which is coiled up in a compact configuration having a free end portion, said dispenser comprising:

a. a housing having a slot;

b. a closed storage compartment for storing food product to be dispensed;

c. an outlet;

d. motor means for advancing a desired length of said free end portion of said strip out of said outlet;

e. a wall isolating said storage compartment from said motor means to keep sanitary food product to be dispensed;

f. severing means for severing said desired length of said free end portion of said strip from the remaining portion of said strip to form a dispensed section of said strip which may be placed in a user's mouth, while the remaining portion of said strip remains within said housing; and, g. manually actuated means for causing said motor means and said severing means to operate, said manually actuated means comprising a switch, said switch being mounted within said slot in said housing and being arranged to linearly slide into any one of three positions, said switch having a first position wherein said motor means is not energized, a second position wherein said motor means is energized, said severing means being mounted on said switch such that movement of said switch from said second position to a third position causes said food product to be severed.

4. The combination of claim 3 wherein said motor means is a motor means for advancing any desired length of said free end portion of said strip out of said outlet.

5. The combination of claim 4 wherein said severing means comprises a manually actuable blade for severing said strip adjacent said outlet irrespective of how much of said free end portion of said strip has been advanced out of said outlet.

6. The combination of claim 3 wherein said motor means comprises an electrically operated motor.

7. The combination of claim 6 additionally comprising battery means for powering said electrically operated motor.

8. The combination of claim 7 wherein said dispenser additionally comprises at least one drive roller coupled to said motor for engaging said strip to advance said strip upon energization of said motor.

9. The combination of claim 3 wherein said strip of food comprises gum.

10. The combination of claim 3 wherein said housing is compact and portable.

*11. The combination of claim 3 wherein when said switch is in said first position, said severing means is in a location relative to said outlet to permit said desired length of said free end portion to extend through said outlet without being severed, when said switch is in said second position said severing means is in a location relative to said outlet to permit said desired length of said free end portion to be directed through said outlet without being severed and wherein when said switch is in said third position, said motor means is not energized and said severing means is in a location relative to said outlet where it will have severed said desired length of said free end portion extending through said outlet.*

* * * * *